United States Patent Office 3,443,974
Patented May 13, 1969

3,443,974
REFRACTORY COMPOSITION
Jacques R. Martinet, San Jose, Calif., assignor to Kaiser Aluminum & Chemical Corporation, Oakland, Calif., a corporation of Delaware
No Drawing. Continuation of application Ser. No. 373,541, June 8, 1964. This application Apr. 21, 1967, Ser. No. 632,830
Int. Cl. C04b *35/12, 35/04*
U.S. Cl. 106—59                 10 Claims

ABSTRACT OF THE DISCLOSURE

A fired product of chromite and periclase, and a batch and process for making such a product are provided, the fired product exhibiting excellent hot strengths after firing at temperatures obtainable by commercially available means, the product containing as adjuvant from 0.2% to 1% alumina, and in one embodiment also from 1% to 10%, based on the amount of alumina added, of titania-yielding material.

---

This application is a continuation of my copending application, Ser. No. 373,541, filed on or about June 8, 1964, now abandoned.

This invention pertains to refractories and particularly to fired refractories comprising mixtures of magnesia and chrome ore.

In the field of basic or non-acid oxide refractories, it has long been known to make such refractories from mixtures of magnesia and chrome ore. In the past, such refractories, even in the fired state, have had relatively low strengths as compared to, for example, silica refractories. This has been true particularly at high temperatures. This relatively low strength has been attributed to the fact that such refractories are bonded together by a matrix of silicate material of lower refractoriness than the grains, such silicates coming largely from the gangue material in the chrome ore. It has recently been noted that when chrome-magnesia or magnesia-chrome refractories are fired at temperatures considerably above those heretofore used, for example at temperatures of 1800° C. or higher, a great increase in the strength of the refractory results, particularly at high temperatures. It has further been found, by microscopic mineralogical examination, that these so-called high fired refractories show a direct bonding between the MgO crystals of the magnesia and the spinel crystals of the chrome ore. In other words, the relatively low melting or less refractory silicate material normally present between the MgO and spinel grains in such a refractory fired to lower temperatures has been removed from between these crystal grains by the high temperature firing and occurs in discrete or isolated, discontinuous zones. While the theory of this direct bonding between the spinel grains and the MgO grains is not completely established, it is believed that at the high firing temperatures involved the surface energy relationships change so that a minimum surface energy for the system is achieved when there is direct crystal-to-crystal contact between the spinel crystals of the chrome ore and the like MgO or periclase crystals of the magnesia and when the silicate material exists as separate or discrete globules or patches and not as a continuous coating over and between the individual refractory grains.

While increased strength is of great advantage in chrome-magnesia or magnesia-chrome refractory products, the relatively high firing temperatures heretofore required present practical problems. Accordingly, a method of obtaining, at lower firing temperatures, for example from 1600° C. to 1750° C., the enhanced strength of high fired or direct bonded refractories is of great practical interest.

It has now been discovered that a fired magnesia-chrome refractory product or article of the herein-described desired high strength and exhibiting the aforementioned direct bonding between the magnesia and chrome crystals is obtained by preparing an admixture consisting essentially of from 10% to 90% magnesia grains and from 90% to 10% chrome or chromite grains as refractory grain component and, in intimate admixture therewith, from 0.2% to 3.0% preferably from 0.2% to 1%, based on the total weight of grain component, of added alumina in the form of a compound adapted to provide alumina upon firing, and firing the admixture. The batch or admixture according to the present invention can be fired to attain the desired results at temperatures obtainable in the ordinary furnace used for firing refractories, i.e., at a temperature of from 1600° C. to 1750° C. In another embodiment of this invention, there is incorporated in the refractory batch, in addition to the added alumina described above, from 1% to 10% preferably about 2%, based on the weight of alumina, of titania. The refractories of this invention are useful for making into shapes or as gunning, ramming or casting materials for lining furnaces, for example high temperature metallurgical furnaces.

The chromite materials employed in the present invention include natural chromite or chrome ores which can be any refractory chromite, such as Philippine, Turkish, African, including Rhodesian and the like, Grecian or other chromite ore or beneficiated chromite ore of the type ordinarily useful in refractories in this art. Reconstituted chromite grains which are known in this art, e.g., as shown in Seil, U.S. 2,037,600 dated Apr. 14, 1936, can be substituted for natural chromite grains wholly or in part. The chromite compound is crushed and sized for incorporation in the refractory of the present invention according to good practice as is well known to those skilled in this art, sizes being chosen for dense packing in the known way. In other words, the chromite ore is employed in sizes from coarse material down to, for example, that retained on 200 mesh. It is preferred that the chromite be of particle sizes substantially entirely retained on 200 mesh but it is found operable to employ up to 20% of the total batch weight of chromite particles passing through a 200 mesh screen. It is preferred for optimum results to employ chromite grains which contain not over about 6% silica. In any event, however, it is preferred that the refractory composition in the present invention contain not over 6% silica on the fired or burned basis, and for highest performance it is preferred that the total composition contain not over 3% $SiO_2$.

The magnesia component is dead burned magnesite or periclase or fused magnesia, as commonly used in brick making art, preferably containing at least about 90% of magnesium oxide. More refractory products and still better results are obtained with higher purity periclase, especially that containing at least 95% magnesium oxide. There can also be incorporated as magnesia-providing grain material in the present invention, magnesia spinels such as grains made up of magnesium chromite, magnesium aluminate or magnesium ferrite or mixtures of these crystals with each other and especially such grains as contain excess periclase crystals. For instance, such grains are described in U.S. 2,775,525; 2,775,526 and 2,775,527 which issued in the names of Leslie W. Austin et al. on Dec. 25, 1956.

The aluminum compound adapted to provide alumina upon firing which is added in the composition of this invention is preferably alumina, in either the deadburned or active state. However, alternatively or in addition to alumina, there can be employed aluminum hydroxide, hydrated alumina, bauxite, gibbsite, aluminum carbonate or the like, or mixtures of such compounds with each other. It is preferred that the aluminous material contain at least 70% aluminum oxide, $Al_2O_3$, on the ignited basis. It is desired that the aluminous material be added in finely divided form, preferably of such particle size that 50% thereof passes through a 100 mesh screen. In some embodiments, the aluminous material can be admixed in the form of a solution in water or other suitable liquid solvent for such material or compound. The term "added alumina" or "added aluminum compound" is used in this specification and claims to distinguish such material from the alumina or aluminum oxide which is contained in the chromite, or in the magnesia as impurity.

When added titania is used in the invention, it can be in the form of $TiO_2$ in any of its crystallographic modifications, or in the form of a compound which will yield $TiO_2$ upon firing. Again, it is preferred that the $TiO_2$ or $TiO_2$-yielding material be added in finely divided form or as a solution.

In making a brick or shaped article, the compositions of this invention preferably contain from 10% to 60% finely divided refractory material, e.g., passing 35 mesh, including from 10% to 35%, based on the total dry weight of the composition, of finely divided periclase which is preferably of the same chemistry or purity as that described above. The finely divided periclase is of a size passing through a 35 mesh screen and preferably a major proportion, over 50%, thereof passes through a 100 mesh screen. In order to obtain the best results in a fired brick it is desirable that a major proportion, preferably from 50% to 80%, of the periclase passing 100 mesh pass through a 325 mesh screen. The finely divided portions of the refractory material provide the bonding component in the refractory shape.

In preparing non-fused refractory articles according to the present invention, the grain material is crushed and sized, according to the usual good practice in this art, to obtain dense packing in the final product. The chromite component is crushed and sized, and is useful in sizes from coarse grains down to, for example, particles substantially entirely retained on 200 mesh screen. It will sometimes be desirable to include chromite passing a 100 mesh screen in an amount up to 20% of the batch. The periclass component is crushed and sized to obtain grains of the desired size ranges, also according to good practice in this art. There can be employed as periclase, for example, magnesia material preferably containing at least 90% magnesium oxide. The magnesia useful herein is a deadburned, substantially inactive, nonplastic product. In other words, there is useful in this invention, periclase or deadburned magnesia. For example, one useful material is deadburned magnesia obtained by the precipitation of magnesium hydroxide from sea water or an inland brine by treatment with an alkaline precipitating agent, such as calcined dolomite, with recovery of the purified, washed precipitate and firing thereof to a deadburned magnesia. Deadburned natural magnesite of suitable chemistry, e.g., preferably containing over 90% MgO and not over 3% $SiO_2$, is useful in the invention. When the coarse grain or aggregate component of the mix according to the present invention, especially that portion retained on 35 mesh, contains from 0 to 80% chromite, the composition should contain at least 10% of finely divided chromite, that is passing through a 35 mesh screen. On the other hand when the refractory batch or mix contains at least 40% of coarse grain component, the latter preferably contains from 80% to 100% chromite, and in such mix the finely divided component can consist essentially of the finely divided periclase and the added alumina as described herein. The overall batch or the fired shape should contain at least 10% of chromite.

The grain or coarse material is preferably thoroughly mixed in a mixer, such as a muller mixer, and is then mixed with the finely divided component as described herein. If desired, the periclase bonding component is ball milled to obtain a fraction passing through a 100 mesh screen. The added alumina compound is, if desired, suitably ball milled together with the periclase to obtain an intimate admixture of these two components. Alternatively, if desired, the dry, finely divided alumina compound is added last. It will also be understood that where there is employed an alumina compound which is soluble in water, alcohol or other tempering liquid, such alumina compound is preferably added in solution in such liquid for best results.

When all of the dry components are in the mixer, they are thoroughly blended and there is then preferably added a bonding agent or binder, soluble in the tempering liquid, preferably water. The binder is suitably any cold-bonding agent known in this art, such as an aqueous solution of sulfite liquor or calcium lignin sulfonate or magnesium lignin sulfonate or mixtures of these two latter components with each other, or sodium silicate or an aqueous solution of magnesium sulfate or magnesium chloride, or a soluble chromium compound, particularly chromic acid, $CrO_3$, or chromous chloride or the like. The binder or cold-binding agent can alternatively be added in the dry state, e.g. in making bricks, and then a tempering amount of water, for example, from 2% to 6% based on the total weight of the batch, is added thereto and the whole is thoroughly blended. The binder is admixed in suitable amount, e.g., from 0.5% to 3%, based on dry weight of the mix, as is usual in this art.

In making formed objects, after thorough mixing, the batch is formed into refractory bricks, blocks or desired shapes in any of the methods usual in this art. For example, the shaped articles can be formed by vibration under low pressure, by casting into molds, or by "dry" pressing in the usual brick press, suitably with the application of a pressure of at least 5000 lbs. per square inch and preferably of over 10,000 lbs. per square inch. The shaped articles art then dried or cured and, in the preferred embodiment, are fired. In order to effect direct bonding of the periclase to the chromite component, the articles are fired or burned at a temperature of at least 1600° C. Preferably the articles are fired at a temperature of from 1600° C. to 1750° C. Firing is carried out for at least one-half hour.

It is an advantage of this invention that, by it, there are produced refractories which, after firing to temperatures relatively readily obtainable in the usual brick furnaces, show strengths, particularly at high temperatures, equal to those obtainable by prior art methods only by much higher, and in some cases practically prohibitively high, firing temperatures, for example 1800° C. and above.

The following examples are given by way of illustration of the invention, the scope of which is defined in the appended claims.

Example I

Bricks are made up by admixing 50 parts by weight chromite grains of the following typical chemical analysis: 32.1% $Cr_2O_3$, 5.3% $SiO_2$, 30.3% $Al_2O_3$, 13.0% FeO, 1.1% CaO, and 18.2% MgO; with 50 parts by weight periclase of the following typical chemical analysis: 2.1% $SiO_2$, 1.1% $R_2O_3$ (including $Fe_2O_3$, $Al_2O_3$, $B_2O_3$, $Mn_2O_3$ and $Cr_2O_3$), 1.1% CaO, and 95.7% MgO (by difference). The chromite is crushed and sized to substantially all passing 35 mesh and substantially all, or 97%, retained 200 mesh. The periclase is employed in the following grain size distributions: passing 6 mesh and retained on 14 mesh, 36.2%; passing 14 mesh and retained on 35 mesh, 8.3%; passing 65 mesh, 34.0% (including 23% passing 325 mesh). In forming Batch A, the periclase and chromite were mixed dry for 1 minute and then there was incorporated 0.7% by weight $CrO_3$ dissolved in water, and the whole mixed for two minutes, after which there was added 0.75% of alkaline earth lignin sulfonate dissolved in water to make the total of from 2.5% to 3% by weight of water in the batch, and the whole thoroughly blended and then formed into bricks.

Batch B was similar to Batch A except that there was added 1 part by weight finely divided Al₂O₃ and 0.02 part by weight finely divided TiO₂. Batch B was processed in exactly the same manner as Batch A and bricks formed from each batch fired to 1700° C. After firing, the modulus of rupture of four specimens from each batch was measured 1260° C., the average strength of the specimens of each batch being presented in Table I.

Example II

Bricks made from Batch A were fired at 1620° C. together with bricks made from Batches C and D which were the same as Batch A except for the addition of 0.25 and 1 part by weight, respectively, of finely divided Al₂O₃. After firing, the modulus of rupture at 1260° C. was again measured, the results also being presented in Table I. Brick specimens formed from Batches A, C, and D were also fired at 1680° C. and the modulus of rupture at 1260° C. measured, the results also being presented in Table I.

Example III

Bricks formed from Batch A and from Batches E, F, G, and H, which are the same as Batch A except for the addition of 0.25, 0.50, 1.0, and 2.0 parts by weight, respectively, of finely divided Al₂O₃ together with finely divided TiO₂ in the amount of 2% of the weight of the added Al₂O₃, were fired at temperatures 1620° C. and 1680° C. and the modulus of rupture measured at 1260° C., with the results indicated in Table I.

The role of the very small TiO₂ addition is not understood, but it has been noted that it appears to have the effect of producing much more uniform strengths in the high modulus of rupture test. Thus, the standard deviation of the 1260° C. modulus of rupture for four specimens of Batch E is about 30 p.s.i., whereas the standard deviation for the 1260° C. modulus of rupture for four specimens from Batch C was about 160 p.s.i.

From Table I it can be seen that for comparable firing temperatures, the addition of added Al₂O₃, with or without TiO₂, produces strengths approximately double that obtainable at the same firing temperature with a composition not containing added Al₂O₃. Similarly, it can be seen that it is possible to obtain strengths at a firing temperature at 1620° C. for example, with Al₂O₃ additions which are not obtained in similar compositions without added Al₂O₃ at firing temperatures of 1700° C.

TABLE I

| Batch | Additive (parts by weight) | | Firing temperature (°C.) | Modulus of rupture (1,260° C) (p.s.i.) | Standard deviation (p.s.i.) |
|---|---|---|---|---|---|
| | Al₂O₃ | TiO₂ | | | |
| A | None | None | 1,620 | 950 | |
| | | | 1,680 | 1,280 | |
| | | | 1,700 | 1,650 | 215 |
| B | 1.0 | 0.02 | 1,700 | 2,653 | 135 |
| C | 0.25 | None | 1,620 | 1,812 | 142 |
| | | | 1,680 | 2,410 | 182 |
| D | 1.0 | None | 1,620 | 1,962 | 200 |
| | | | 1,680 | 2,642 | 146 |
| E | 0.25 | 0.005 | 1,620 | 1,806 | 29 |
| | | | 1,680 | 2,818 | 33 |
| F | 0.50 | 0.01 | 1,620 | 1,698 | 59 |
| | | | 1,680 | 2,672 | 84 |
| G | 1.0 | 0.02 | 1,620 | 1,525 | 94 |
| | | | 1,680 | 2,768 | 218 |
| H | 2.0 | 0.04 | 1,620 | 1,771 | 148 |
| | | | 1,680 | 2,400 | 120 |

In the specifications and claims, parts are by weight and percentages are by weight on the basis of the weight of total dry refractory particles, unless otherwise indicated. Mesh sizes referred to herein are Tyler standard screen sizes which are defined in Chemical Engineers' Handbook, John H. Perry, editor-in-chief, third edition, 1950, published by McGraw Hill Book Company, at page 963. For example, a size passing a 100 mesh screen corresponds to 147 microns, and that passing 200 mesh to 74 microns. Analyses of mineral components are reported in the usual manner, expressed as simple oxides, e.g., MgO, SiO₂, although the components may actually be present in various combinations, e,g., as magnesium silicate. The term "magnesia" is intended to include periclase, dead burned magnesia, and dead burned magnesite from various sources, and to include especially any such dead burned product containing at least 65% magnesium oxide.

Having now described the invention, what is claimed is:

1. The process of making a direct-bonded fired refractory comprising:
   (1) mixing a refractory composition consisting essentially of from 10 to 90% magnesia from 10 to 90% chrome ore, and from 0.2% to 1% added alumina in the form of an Al₂O₃-yielding material;
   (2) forming said mixture into a coherent shape; and
   (3) firing said shape to a temperature of at least 1600° C. to achieve direct crystal-to-crystal bonding between the magnesia crystals and the spinel crystals of the chrome ore.

2. The process according to claim 1 wherein said mixture also contains titania-yielding material in an amount from 1% to 10% of TiO₂ based on the weight of added Al₂O₃.

3. The process according to claim 2 wherein said titania-yielding material yields an amount of TiO₂ equal to 2% of the weight of added Al₂O₃.

4. The process according to claim 1 wherein said firing temperature is between 1680° C. and 1750° C.

5. A refractory batch consisting essentially of from 10 to 90% dead-burned magnesia, from 10 to 90% chromite, and from 0.2% to 1% added alumina in the form of an Al₂O₃-yielding material, said batch being adapted to form direct bonding between said magnesia and said chromite upon firing at from 1600° C. to 1750° C.

6. Batch as in claim 5 containing also a titania-yielding material in an amount from 1 %to 10% expressed as TiO₂ based on the weight of said alumina.

7. A refractory batch according to claim 6 wherein the amount of TiO₂ is 2%.

8. A fired refractory shape made from a batch consisting essentially of from 10% to 90% magnesia grains and from 90% to 10% chromite grains, and uniformly admixed therewith from 0.2% to 1% addel alumina, said shape exhibiting direct bonding between at least a portion of said magnesia and said chromite grains.

9. A refractory shape as in claim 8 containing also from 1% to 10% titania-yielding material expressed as TiO₂, based on the weight of said Al₂O₃.

10. A refractory shape as in claim 9 containing about 2% titania based on the weight of said alumina present.

References Cited

UNITED STATES PATENTS 3,184,322   5/1965   Parikh et al. _____ 106—59

JAMES E. POER, Primary Examiner.

U.S. Cl. X.R.

106—62